Figure 1:
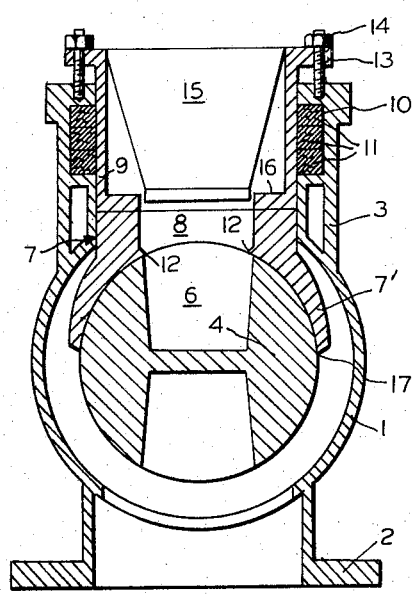

Nov. 21, 1967  KARL-HEINZ WIELEBA  3,353,723

ROTARY VALVE

Filed Aug. 6, 1965

INVENTOR
KARL-HEINZ WIELEBA

BY  *Dodge and Sons*

ATTORNEYS

United States Patent Office 3,353,723
Patented Nov. 21, 1967

3,353,723
ROTARY VALVE
Karl-Heinz Wieleba, Ravensburg, Wurttemberg, Germany, assignor to Escher Wyss G.m.b.H., Ravensburg, Wurttemberg, Germany, a corporation of Germany
Filed Aug. 6, 1965, Ser. No. 477,873
Claims priority, application Germany, Sept. 5, 1964, E 27,733
1 Claim. (Cl. 222—368)

This invention relates to a rotary valve for batching and charging loose materials, for instance granular, chipped or otherwise comminuted substances, into a container under internal pressure. Such rotary valves are required for example for charging wood or other vegetable chippings into cellulose digesters, in which, as is known, a more or less elevated pressure prevails according to the nature of the charge and the degree of temperature. The purpose of the rotary valve is to charge the said substance into the digester, without steam or reaction gas being blown off.

Known rotary valves having a housing which is fast with the digester, and in which a rotor of cylindrical or conical shape is rotatably mounted. Arranged between rotor and housing is a shoe serving to seal the apparatus. The rotor has one or more recesses, into which the loose materials are charged from above and which, during the rotation of the rotor about its axis, convey the materials to the interior of the pressure container, that is to say, the cellulose digester.

In apparatus of this kind, particular difficulties arise through the necessary sealing of the rotor with respect to the housing. These difficulties are increased still further by the fact that during operation, the rotary valve is exposed to different temperatures, so that owing to thermal expansion, it is distorted in a practically uncontrollable manner. In addition, on long-continued operation, there is the unavoidable wear of the rotor, so that the valve has to be re-adjusted after relatively short intervals of time.

A known rotary valve has for this purpose a conical rotor, which is mounted in a likewise conical housing or a housing shoe. During operation, the rotor is pressed axially into the housing, whereby the necessary sealing is obtained. In proportion to the wear of the rotor, due to its rotation, it advances farther into the housing, so that it is thus possible to keep the apparatus sealed over a longer working period. A disadvantage of conical rotary valves, however, is the fact that the recess in the rotor is displaced in the course of operation relative to the charging orifice and the digester, and hence only permits small adjustment distances. In addition, this arrangement necessitates the use of liners or shoes, which completely surround the rotor, this again being disadvantageous since, with pressure or temperature fluctuations the rotor may thereby seize up, and in addition the shoes can be replaced only with difficulty and with a considerable expenditure of time.

In another known rotary valve, a cylindrical rotor is provided, which is pressed by means of wedges or screws against the upper half of the sealing shoe, mounted fast in the housing. This arrangement also provides a practically adequate seal for a certain time; a drawback is, however, that owing to wear, the rotor is gradually displaced in the radial direction, resulting in driving difficulties, which may be removed only to a limited extent by adjustment. In this arrangement also, there is still the disadvantage that replacement of the shoe can be carried out only with a considerable expenditure of time. In addition, for adjusting the rotor, the valve must be put out of service and the pressure released.

In almost all the known rotary valves, large quantities of leakage gas and vapour collect in the upper part of the valve housing and necessitate the provision of special discharge ducts. If such discharge ducts are not provided, the leakage gases and vapours form cushions, through which the materials to be charged cannot immediately pass, and to overcome which other devices are necessary, such as conveyor worms, vibrators and so forth. If, however, discharge ducts are provided for the removal of these gases and vapours, it is unavoidable for gas or vapour losses to occur through these ducts, and also the amounts of pressure gas and vapour, which are carried upward by the recesses in the rotor on each revolution of the latter, are also discharged through said ducts. These periodically occurring bodies of gas could, however, be introduced into the charging hopper for loosening the material to be charged, and could thus be usefully employed.

The rotary valve according to the invention now represents a particularly simple and reliable solution of the problem indicated, in which the disadvantages described are largely eliminated. The valve is also provided with a rotor having a substantially cylindrical portion provided with one or more recesses for receiving the material, which rotor is rotatably mounted in a housing sealed by means of a shoe. The valve according to the invention is characterised in that the shoe is slidable relative to the housing and is adapted to be pressed against the rotor. In this way, it is possible, independently of varying thermal stresses and wear, to produce an always satisfactory seal. The press-on shoe can be re-adjusted by means of screws or springs, a manipulation which can be carried out simply and in a short time, without the necessity to release the pressure.

The shoe used in the rotary valve according to the invention must embrace the rotor only to the extent required for secure sealing. In most cases, the shoe will have the form of a half-shell or saddle adapted to the rotor in size and curvature, and having in the region of the recesses of the rotor a perforation for the material to be charged. In the region of the perforation also, the shoe may carry a neck-like extension, fitting in the housing and sealed with respect thereto. Sealing can be effected by means of sealing rings of carbon, copper, plastics, and so forth, or by means of compensators, which connect together the parts to be sealed, resiliently and pressure-tight, as is known per se in another connection.

The neck-like extension is advantageously detachably mounted on the saddle. The object of this is to permit replacement of the saddle, subjected to wear, after a certain service time, without having to renew the neck-like extension.

In a further development of the invention, it is proposed to grind the edges on the through-going opening and in the longitudinal direction of the saddle knife-like, and if necessary to harden them. The result of this is that the quantity of loose material charged into the recess of the rotor is separated from the excess amount of material during the rotation of the rotor, and the running and sealing surfaces remain clean.

For simple and uniform application of the slidable shoe against the rotor, one end of the neck-like extension may project from the housing and carry a rotatably mounted, preferably fixable screw, which is connected to the housing in a power-transmitting manner.

Figure 2:
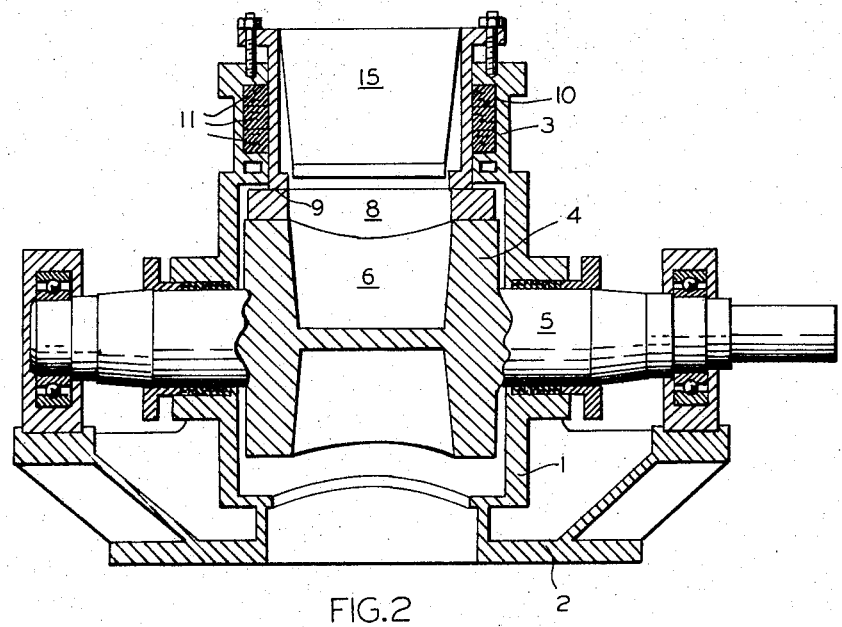

For further explanation of the rotary valve according to this invention reference is made to the accompanying drawings showing an embodiment thereof diagrammatically. In these drawings:

FIG. 1 shows a cross section through the rotary valve;
FIG. 2 shows a longitudinal section.

The housing 1 of the rotary valve has on its lower side a flange 2, by means of which the valve can be secured pressure-tight to a pressure container, for instance a cellulose digester or the like. On its upper side, the housing 1 has a neck-like extension 3, through which the loose material is supplied to the valve. A through-going opening for the passage of the material extends from the extension 3 to the discharge opening in flange 2. In the interior of the housing 1 a cylindrical rotor 4 is mounted rotatably about an axis extending across said through-going opening. A mode of mounting as well as the driving shaft 5 for the rotor may be gathered from FIG. 2.

The rotor 4 has a cylindrical portion provided with recesses 6, serving to receive the loose material and the effect of which is, at the same time, to convey a portion of loose material through the valve on each rotor revolution.

In the through-going opening, on the supply side of the rotor 4, a shoe 7 is mounted slidably relative to the housing 1 so that its saddle 7' can be pressed against the rotor 4. The shoe 7 has a perforation 8 for the material to be supplied and a neck 9, which produces sealing of the slidable shoe relative to the housing, and by means of which the pressing force is also transmitted to the saddle 7'. The perforation 8 registers with the recess 6 of the rotor 4 when this recess 6 is situated on the supply side of the latter. The neck 9 is detachably mounted on the saddle 7', so that the saddle 7' subjected to wear can be replaced, without the neck 9 also having to be replaced at the same time.

The extension 3 of the housing 1 is provided in the interior with a recess 10, in which one or more packings 11, optionally also compensators, may be inserted, as a fluid-tight seal between the shoe neck 9 and the housing 1. These packings or compensators are readily accessible and may be replaced by new ones, when the neck 9 of the shoe 7 has been withdrawn upwardly from the apparatus.

The longitudinal edges 12 and 17 of the saddle 7' are ground knife-like and possibly hardened. The result of this is that on each revolution of the rotor 4, the quantity of loose material charged into the recess 6 is separated smoothly upwardly by the edge 12, so that on each revolution, constant and complete filling of the recess is always obtained, and the running and sealing surfaces of the rotor 4 are kept clean.

The neck 9 of the shoe 7 carries on its upper end a flange 13, in which at least one, preferably however three screws 14 are rotatably mounted in such a manner that they are connected to the extension 3 in a power-transmitting manner. By tightening of the screws 14 an adjustable pressure is transmitted to the saddle 7' and the latter is thereby pressed against the rotor 4.

There may also be arranged in the interior of the neck 9 a hopper 15, serving to guide the material to be charged, and to prevent material depositing on the step-like recess 16 and sticking there.

The mode of operation of the rotary valve according to the invention is as follows: When the valve has assumed the position shown in FIGS. 1 and 2, the loose material falls through the hopper into the upper recess 6 of the rotor. By reason of the continuous rotation of the rotor, the material is cut off the overlying column of loose material by the knife-like edges 12. When the rotor has rotated so far that the recess 6 is freely open below, the material falls from the recess, and finally passes through the lower extension of the housing into the interior of the pressure container, for instance the cellulose digester.

The recess 6, during discharge, is filled with pressure gas or vapour. During the rotation of the rotor, this quantity of pressure gas or vapour finally passes to the top and escapes through the hopper 15. The escape of this comparatively small quantity of vapour or gas is desirable, because periodical loosening of the loose material accumulated in the hopper 15 is thereby effected. Such loosening is advantageous for preventing or eliminating bridge formations and the like in the case of loose materials which do not flow well.

The speed of rotation of the rotor depends in practice on the throughput desired, and naturally also on the size of the recesses and the nature of the loose material to be batched and charged. In charging wood chippings, about 20 to 25 mm. long, into cellulose digesters, rotor speeds of up to 25 r.p.m. have proved satisfactory over long intervals of time.

What is claimed is:

A rotary valve for batching and charging loose material into a container under internal pressure comprising (a) a housing formed with a through opening for the passage of said loose material;

(b) a rotor supported for rotation in the housing and extending across said through opening, the rotor having a cylindrical portion provided with at least one recess for the reception of said loose material;

(c) a sliding shoe located in said through opening at the material supply side of the rotor and provided with a perforation which registers with said recess when the latter is at the supply side of the rotor, (d) the shoe comprising a saddle having a cylindrical surface which mates with the cylindrical portion of the rotor, and a separate neck which is guided for sliding movement by the housing and has an end portion which extends outside the housing;

(e) sealing means interposed between the outer periphery of the neck and the housing and preventing leakage between the interior and the exterior of the housing along the neck; and (f) at least one screw reacting between said end portion of the neck and the housing and adapted when turned to press the shoe against the rotor, (g) the screw being accessible from outside the housing and being isolated from said through opening.

References Cited

UNITED STATES PATENTS

| | | | |
|---|---|---|---|
| 852,603 | 5/1907 | Hanlon | 222—368 |
| 1,657,761 | 1/1928 | Novelli | 222—304 |
| 2,401,684 | 6/1946 | Gumilar | 222—368 X |
| 2,428,241 | 9/1947 | Pootjes | 222—368 |
| 2,594,974 | 4/1952 | Mylting | 222—368 X |
| 2,907,499 | 10/1959 | Agronin | 222—368 X |
| 2,917,208 | 12/1959 | Arnold | 222—368 |
| 3,077,272 | 2/1963 | Reinhall | 222—368 X |
| 3,130,879 | 4/1964 | Messing | 222—368 |

FOREIGN PATENTS 974,175  10/1960  Germany.

WALTER SOBIN, *Primary Examiner.*